(12) United States Patent
Pinnock et al.

(10) Patent No.: US 12,539,246 B2
(45) Date of Patent: Feb. 3, 2026

(54) WIRELESS WEARABLE SENSOR SYSTEMS, DEVICES, AND METHODS FOR ROBOTIC EXOSKELETONS AND DYNAMIC MOTION APPLICATIONS

(71) Applicant: Motion Augmented LLC, Farmington Hills, MI (US)

(72) Inventors: Cameron Brandon Pinnock, Farmington, MI (US); Haroun Algahmi, Detroit, MI (US)

(73) Assignee: Motion Augmented LLC, Farmington Hills, MI (US)

( * ) Notice: Subject to any disclaimer, the term of this patent is extended or adjusted under 35 U.S.C. 154(b) by 419 days.

(21) Appl. No.: 18/298,687

(22) Filed: Apr. 11, 2023

(65) Prior Publication Data

US 2024/0075340 A1 Mar. 7, 2024

Related U.S. Application Data

(60) Provisional application No. 63/418,135, filed on Oct. 21, 2022, provisional application No. 63/403,425, filed on Sep. 2, 2022.

(51) Int. Cl.
*A61H 1/02* (2006.01)
*A61H 1/00* (2006.01)
(Continued)

(52) U.S. Cl.
CPC ........... *A61H 1/0255* (2013.01); *A61H 1/008* (2013.01); *A61H 1/024* (2013.01); *A61H 1/0266* (2013.01);
(Continued)

(58) Field of Classification Search
CPC ........ A61H 1/0255; A61H 1/024; A61H 3/00; A61H 2003/007; A61H 2201/1207;
(Continued)

(56) References Cited

U.S. PATENT DOCUMENTS

| 7,190,141 B1 | 3/2007 | Ashrafiuon et al. |
| 7,774,177 B2 | 8/2010 | Dariush |

(Continued)

FOREIGN PATENT DOCUMENTS

WO 2016044251 A1 3/2016

OTHER PUBLICATIONS

Christopher Nesler, Gray Thomas, Nikhil Divekar, Elliot J. Rouse, and Robert D. Gregg, "Enhancing Voluntary Motion with Modular, Backdrivable, Powered Hip and Knee Orthoses", IEEE Robotics and Automation Letters, Jan. 2, 2022, pp. 1-8.

*Primary Examiner* — Francis C Gray
(74) *Attorney, Agent, or Firm* — Quinn IP Law

(57) ABSTRACT

Presented are wearable sensor systems for monitoring user movement, methods for making/using such systems, exoskeletons employing such systems, and wireless-enabled wearable sensor devices for performing biometric measurements. A sensor system for monitoring movement of a user includes a wearable sensor device that is communicatively connectable to a sensor linking node. The sensor linking node wirelessly receives sensor data from the wearable sensor device and wirelessly communicates the received sensor data to a remote computing node. The wearable sensor device includes an expandable device body, such as an elastic compression sleeve or an adjustable strap, that is worn on an appendage of the user. The device body includes a mounting interface, such as mating hook-and-loop fastener pads, that removably mounts thereon a biometric sensor core (BSC) unit. The BSC unit contains a microcontroller assembly that is integral with a microcontroller device, a biometric sensor array, and a wireless communication device.

20 Claims, 7 Drawing Sheets

(51) Int. Cl.
*A61H 3/00* (2006.01)
*A63B 24/00* (2006.01)
*B25J 9/00* (2006.01)
*B25J 17/00* (2006.01)
B25J 9/10 (2006.01)
B25J 9/12 (2006.01)
F16D 27/09 (2006.01)

(52) U.S. Cl.
CPC ......... *A61H 1/0274* (2013.01); *A61H 1/0277* (2013.01); *A61H 1/0281* (2013.01); *A61H 3/00* (2013.01); *A63B 24/0006* (2013.01); *A63B 24/0062* (2013.01); *B25J 9/0006* (2013.01); *B25J 17/00* (2013.01); A61G 2203/10 (2013.01); A61H 2003/007 (2013.01); A61H 2201/1207 (2013.01); A61H 2201/1215 (2013.01); A61H 2201/1276 (2013.01); A61H 2201/1445 (2013.01); A61H 2201/1472 (2013.01); A61H 2201/1614 (2013.01); A61H 2201/1619 (2013.01); A61H 2201/1628 (2013.01); A61H 2201/1635 (2013.01); A61H 2201/164 (2013.01); A61H 2201/165 (2013.01); A61H 2201/1652 (2013.01); A61H 2201/1673 (2013.01); A61H 2201/5007 (2013.01); A61H 2201/503 (2013.01); A61H 2201/5064 (2013.01); A61H 2201/5069 (2013.01); A61H 2201/5097 (2013.01); A61H 2203/0406 (2013.01); A61H 2203/0418 (2013.01); A61H 2230/00 (2013.01); A61H 2230/605 (2013.01); A63B 2220/803 (2013.01); A63B 2220/836 (2013.01); A63B 2225/20 (2013.01); A63B 2225/50 (2013.01); B25J 9/102 (2013.01); B25J 9/1025 (2013.01); B25J 9/126 (2013.01); F16D 27/09 (2013.01)

(58) Field of Classification Search
CPC ...... A61H 2201/165; A61H 2201/1652; A61H 2201/5007; A61H 2201/5097; A61H 2230/00; A63B 24/0006; A63B 24/0062; A63B 2220/803; A63B 2220/836; A63B 2225/50; A63B 2022/0094; A63B 21/4007; A63B 21/4009; A63B 21/4011; A63B 21/4025; A63B 23/035; A63B 23/03508

See application file for complete search history.

(56) References Cited

U.S. PATENT DOCUMENTS

| | | | |
|---|---|---|---|
| 7,947,004 B2 | 5/2011 | Kazerooni et al. | |
| 8,057,410 B2 | 11/2011 | Angold et al. | |
| 8,316,719 B2 | 11/2012 | Majidi et al. | |
| 9,351,900 B2* | 5/2016 | Walsh | A61F 2/68 |
| 9,841,331 B2 | 12/2017 | Wood et al. | |
| 10,342,723 B2 | 7/2019 | Julin | |
| 10,350,130 B2 | 7/2019 | Hughes et al. | |
| 10,470,671 B2 | 11/2019 | Braun et al. | |
| 10,583,551 B2 | 3/2020 | Angold et al. | |
| 10,702,441 B2 | 7/2020 | Julin et al. | |
| 11,673,253 B2 | 6/2023 | Julin | |
| 2007/0123997 A1 | 5/2007 | Herr et al. | |
| 2009/0325739 A1 | 12/2009 | Gold | |
| 2011/0105966 A1 | 5/2011 | Kazerooni et al. | |
| 2011/0245738 A1 | 10/2011 | Agrawal et al. | |
| 2012/0108394 A1 | 5/2012 | Jones et al. | |
| 2012/0179075 A1 | 7/2012 | Perry et al. | |
| 2013/0253385 A1* | 9/2013 | Goffer | B25J 9/0006 601/35 |
| 2014/0248594 A1 | 9/2014 | Navas | |
| 2014/0372440 A1 | 12/2014 | Cains | |
| 2015/0182810 A1 | 7/2015 | Thurman et al. | |
| 2015/0351995 A1* | 12/2015 | Zoss | A61H 1/0244 623/32 |
| 2017/0144309 A1* | 5/2017 | Sankai | B25J 17/00 |
| 2019/0251238 A1 | 8/2019 | Venkatraman | |
| 2020/0178895 A1 | 6/2020 | Lu et al. | |
| 2021/0128972 A1* | 5/2021 | Lee | A63B 21/00181 |
| 2023/0218464 A1 | 7/2023 | Wabg et al. | |

* cited by examiner

WIRELESS WEARABLE SENSOR SYSTEMS, DEVICES, AND METHODS FOR ROBOTIC EXOSKELETONS AND DYNAMIC MOTION APPLICATIONS

CLAIM OF PRIORITY AND CROSS-REFERENCE TO RELATED APPLICATIONS

This application claims the benefit of and priority to U.S. Provisional Patent Application No. 63/403,425, which was filed on Sep. 2, 2022, and U.S. Provisional Patent Application No. 63/418,135, which was filed on Oct. 21, 2022, both of which are incorporated herein by reference in their respective entireties and for all purposes.

TECHNICAL FIELD

The present disclosure relates generally to wearable devices and systems for examining dynamic motion. More specifically, aspects of this disclosure relate to wireless sensor systems for measuring forces and monitoring athletic performance for users engaged in sporting activities.

BACKGROUND

Monitoring of athletic performance is used for many sporting activities, whether it is a professional athlete training for a competition or a recreational athlete exercising to maintain fitness. Specialized athlete management and monitoring systems, for example, enable coaches and staff to better gauge where players are in their individual training progression and injury recovery. These systems also help players and individuals participating in athletic activities to track their own performance, health, and related biometric data.

Wearable body-motion-sensing technology has enhanced athlete management and monitoring as well as individualized fitness. Wireless motion sensors packaged inside an athlete's equipment, integrated into a dedicated wearable device, or placed on the athlete's skin are used in both professional and recreational applications. Professional motion sensor systems, for example, may employ light-emitting diodes (LEDs) that are placed on an athlete's body and tracked using one or more high-precession cameras. For recreational use, motion sensors may use geopositional tracking and incorporate accelerometers to measure the number of steps and the distance traveled for leisure or exercise activities. Using accelerometers placed on the body to measure kinematic limb force generation adds another dimension to biometric monitoring.

In the area of combat sports, an interactive system using impact force sensors embedded in frame-mounted striking pads to measure impact forces is presented in U.S. Patent App. Pub. No. 2012/0108394 A1, to Terry G. Jones, et al. For the '394 Publication, the sensors communicate with an electronic control unit to detect and measure strikes to the pads, such as punching, kicking, elbowing, kneeing, etc. of the pads. This system design only allows for measurement of reaction forces, is not wearable by the user, limits use to a confined location, and does not capture kinematic forces of the strike itself while in transit.

An example of a wearable sensor system used for monitoring athletic performance in combat sports is presented in U.S. Patent App. Pub. No. 2014/0248594 A1, to Victor Xavier Navas et al. In the '594 Publication, accelerometers are embedded in boxing gloves or mixed martial arts (MMA) gloves to measure the impact force of a user's strikes. Each wearable device uses an accelerometer that is wired to a microcontroller, which in return is wired to a wireless connectivity module. While this system is robust, wireless, wearable, and is able to measure in-transit forces, the wearable components are not integrated into the microcontroller and, thus, are bulky and not user friendly.

A similar system using martial arts gloves with embedded electronics for athlete monitoring and evaluation is presented in U.S. Patent App. Pub. No. 2014/0372440 A1, to Steven Cains et al. In the '440 Publication, a mixed martial arts glove is equipped with an impact-sensing circuit board that contains a microcontroller, a wireless chip, and 3-axis accelerometers connected to an impact sensing circuit. This device is less bulky via the use of a circuit board that holds the sensing and wireless communications components. However, the device does not use Bluetooth Low Energy (BLE) as a short-range wireless protocol. Also, the circuit board is stitched to the MMA glove as a method of attachment; in so doing, there is a significant risk of damaging the electronics when the gloves need to be cleaned.

In the sport of American Football, U.S. Patent App. Pub. No. 2015/0182810 A1, to Robert Thurman et al., discloses use of an accelerometer that is embedded inside a football. This device, when caught by a receiver, will sense and wirelessly relay back the impact force and catch quality of the ball via software. Presented in U.S. Patent App. Pub. No. 2009/0325739 A1, to Robert S. Gold et al., is a similar system that is applied to the sport of basketball, in which an accelerometer is embedded inside a ball. In this example, the embedded sensor measures the position of the ball while in transit, e.g., when the ball is passed or shot. The '810 and '739 Publications do not utilize force measurement on the athlete's body, which may be necessary to build an understanding of the kinematic forces of their movements. All of the above and below discussed U.S. Patents, Patent Applications, and Patent Application Publications are incorporated herein by reference in their respective entireties and for all purposes.

SUMMARY

Presented herein are wearable sensor systems for monitoring dynamic movements, methods for making and methods for using such systems, robotic exoskeletons employing such systems, and wireless-enabled, sensor-integrated gauntlets for measuring forces generated during sports activities. In an example, a wearable gauntlet system is disclosed for measuring forces experienced by athletes during training or competition. The wearable gauntlet system contains or, in at least some applications, consists essentially of a built-in wireless data transmission module, a microcontroller, and a nine degrees-of-freedom (DoF) sensor. The wearable gauntlet system may utilize a distributed array of wireless-enabled wearable gauntlet devices that are configured to be easily adorned on the user's arms and/or legs. Each device is equipped with a biometric sensor core (BSC) unit that is detachably coupled to a gauntlet cuff, which may be fabricated from cloth, polymer, or composite material, such that the sensor core unit can be effectively cleaned without damaging the electronics.

When a user makes a movement with their arms, hands, legs or feet, one or more in-transit forces of such action may be calculated and the resultant sensor data transmitted, e.g., via Bluetooth Low Energy (BLE) technology, to a compatible Internet of Things (IoT) device or similarly suitable data computing module. The wearable gauntlet system enables users and other parties to measure in-transit and impact forces, e.g., in real-time or near real-time, as well as record the sensor data for further observation and/or processing at a later time. All of the wearable gauntlet's electronic hardware may be packaged as a self-contained unit within a protective BSC outer housing that detachable mounts onto a cuff or other user-wearable footwear or apparel. These are next-generation universal force measurement systems, methods, and devices that can be used in various sporting applications, athletic training applications, and other dynamic motion applications beyond what are presented herein as some non-limiting functional examples.

Also presented are exoskeleton (exo) systems with attendant control logic for assisting users with movement, power clutch transmissions for exoskeletons, articulating joint and appendage units for exoskeletons, modular motor units for exoskeletons, wireless biometric controls systems for exoskeletons, and methods for making and methods for operating disclosed exoskeletons, transmissions, motor units, appendage-joint assemblies, and/or biometric systems. In an example, there is presented a modular exoskeleton adaptable with modular motor unit attachments that increase a user's strength when electrically powered. When not powered, the exoskeleton is in a passive operating mode that allows the user to freely move without assistance. The user can detach the motor units and customize the passive exoskeleton to multiple different architectures. Disclosed exoskeleton systems may employ Internet of Things (IoT) technology, e.g., that uses Bluetooth Low Energy technology (BLE), to connect biometric sensors to a central processing unit (CPU) of the exoskeleton and, if desired, to other resident system devices.

The exoskeleton frame structure may be made active, at least in part, via the attachment of one or more computer-controlled motor units. When powered on, these motor units supplement or supply user strength for the wearer of the exoskeleton suit. Output of the motor units may be governed by a system central processing unit (CPU) based on feedback from a distributed network of wireless biometric sensors. Biometric sensors that are used to control the exoskeleton system may include motion sensors for detecting angle positioning and EMG sensors for detecting muscle activity. A modular exoskeleton architecture that is designed to add one or more motor unit modules to enable an active robotic exoskeleton provides multiple uses for the wearer as well as various economic benefits. When set in a passive operating mode, the exoskeleton frame structure may provide the user with the ability to stand or hold a squatting position, e.g., via mechanically locking parts of the exoskeleton. When set in an active operating mode, a user can activate one or more motor units to aid in augmenting the wearer's strength capabilities. This enables a user to purchase/integrate only what is needed, and to modify the exoskeletal functionality at any time, rather than being limited to buying/using either a passive exoskeleton or a robotic exoskeleton.

Aspects of this disclosure are directed to networked sensor systems for monitoring dynamic user movements and measuring biometric variables attendant thereto. In an example, there is presented a sensor system for monitoring movement of a user. The sensor system includes a wearable sensor device that is communicatively connectable to a sensor linking node. The sensor linking node wirelessly communicates with the wearable sensor device to receive therefrom sensor data and wirelessly transmits the received sensor data to a remote computing node. The wearable sensor device includes an expandable device body, such as an elastic compression sleeve or an adjustable strap, that is structurally configured to be worn on an appendage of the user. The device body includes a mounting interface, such as a pair of mating hook-and-loop fastener pads, that removably mounts thereon a biometric sensor core unit. The BSC unit contains a microcontroller assembly that is integral with a microcontroller device, a biometric sensor array, and a wireless communication device.

Additional aspects of this disclosure are directed to robotic exoskeleton systems for assisting with movement of a user. As used herein, the terms "exoskeleton" and "exoskeleton system", including permutations thereof, may be used interchangeably and synonymously to include any relevant exoskeleton platform, such as: medical exoskeletons, industrial exoskeletons, and combat exoskeletons; passive-type, active-type, and hybrid-type exoskeletons; fixed architectures, supported architectures, and mobile architectures; soft-suit and hard-suite designs; and full-body, lower-extremity, and upper-extremity exoskeletons, etc. In an example, an exoskeleton system includes an exoskeleton frame with at least one articulating joint and appendage assembly that attaches to an appendage of a user. The exoskeleton system also includes one or more modular motor units that removably attach to the exoskeleton joint assembly/assemblies. Controller-automated operation of one or more of the motor units is based, at least in part, on sensor data provided by one or more wireless-enabled wearable sensor devices.

Aspects of this disclosure are also directed to wearable sensing devices for networked sensor systems that monitor user movement, measure variables associated with such movement, and compute resultant forces experienced by the user. In an example, a wearable sensing device includes an expandable device body that is structurally configured to friction fit onto an appendage of a user, such as the user's wrist, forearm, upper arm, ankle, calf, thigh, etc. The expandable device body includes a mounting interface that removably mounts thereon a biometric sensor core unit, e.g., without the use of adhesives, threaded fasteners, mounting brackets, etc. The BSC unit includes a BSC unit housing with an internal housing compartment having a compartment opening, and a BSC unit lid that detachably mounts onto the BSC unit housing to thereby cover the opening. Disposed inside the housing compartment is a microcontroller assembly that is integral with a microcontroller device, a biometric sensor array, and a wireless communication device. The BSC unit also contains a rechargeable battery module that is disposed inside the housing compartment and operable to power the microcontroller assembly.

Aspects of this disclosure are also directed to manufacturing workflow processes, computer-readable media, and control logic for making or for using any of the disclosed wearable sensor devices, biometric sensor systems, exoskeleton structures, and/or other disclosed hardware and componentry. In an example, a method is presented for assembling a wearable sensing device, e.g., for use with a sensor system having a wireless-enabled linking node. This representative method includes, in any order and in any combination with any of the above and below disclosed options and features: receiving an expandable device body configured to be worn on an appendage of a user, the expandable device body including a mounting interface; and removably attaching a biometric sensor core unit to the mounting interface, the BSC unit containing a microcontroller assembly integral with a microcontroller device, a biometric sensor array, and a wireless communication device communicatively connectable to the wireless-enabled linking node.

For any of the disclosed systems, methods, and devices, the expandable device body may include a compression sleeve and/or an adjustable strap, each of which is structurally configured to friction fit therein the appendage of the user. For at least some embodiments, the expandable device body consists essentially of just the compression sleeve. As another option, the mounting interface may include an attachment pad that removably mounts thereon the BSC unit without a threaded fastener, a bracket, a latch, an adhesive, a snap fastener, etc. To this end, the mounting interface may include a first fastener pad with multiple hooks (or multiple loops), and the BSC unit includes a second fastener pad with multiple loops (or multiple hooks). In this instance, the hooks of one fastener pad mate with the loops of the other fastener pad to thereby releasably attach the first fastener pad and device body to the second fastener pad and BSC unit.

For any of the disclosed systems, methods, and devices, the microcontroller assembly may include a single integrated circuit (IC) chip with the BSC unit's microcontroller device, biometric sensor array, and wireless communications device all mounted onto this single IC chip. As a further option, the biometric sensor array may include a multi-axis motion sensor that is connected to the microcontroller and wireless communications devices and is operable to measure motion of the user's appendage. In this instance, the multi-axis motion sensor may be an embedded nine degrees-of-freedom (DoF) motion sensor array with a 6-axis inertial measurement unit (IMU) and a 3-axis magnetometer. Optionally, the wireless communications device may include an embedded Bluetooth Low Energy (BLE) module.

For any of the disclosed systems, methods, and devices, the BSC unit may include a one-piece BSC unit housing with an internal housing compartment, and a one-piece BSC unit lid that is detachably mounted onto the BSC unit housing to thereby cover the housing compartment's opening and secure the microcontroller assembly inside the housing compartment. As a further option, the BSC unit may include a rechargeable battery module that is disposed inside the housing compartment and operable to power the microcontroller assembly. The BSC unit may also include a pair of foam pads, each of which is disposed inside the housing compartment and located on a respective side of the microcontroller assembly. As another option, the BSC unit may consist essentially of the BSC unit housing, the BSC unit lid, the microcontroller assembly, the rechargeable battery module, and the foam pads.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
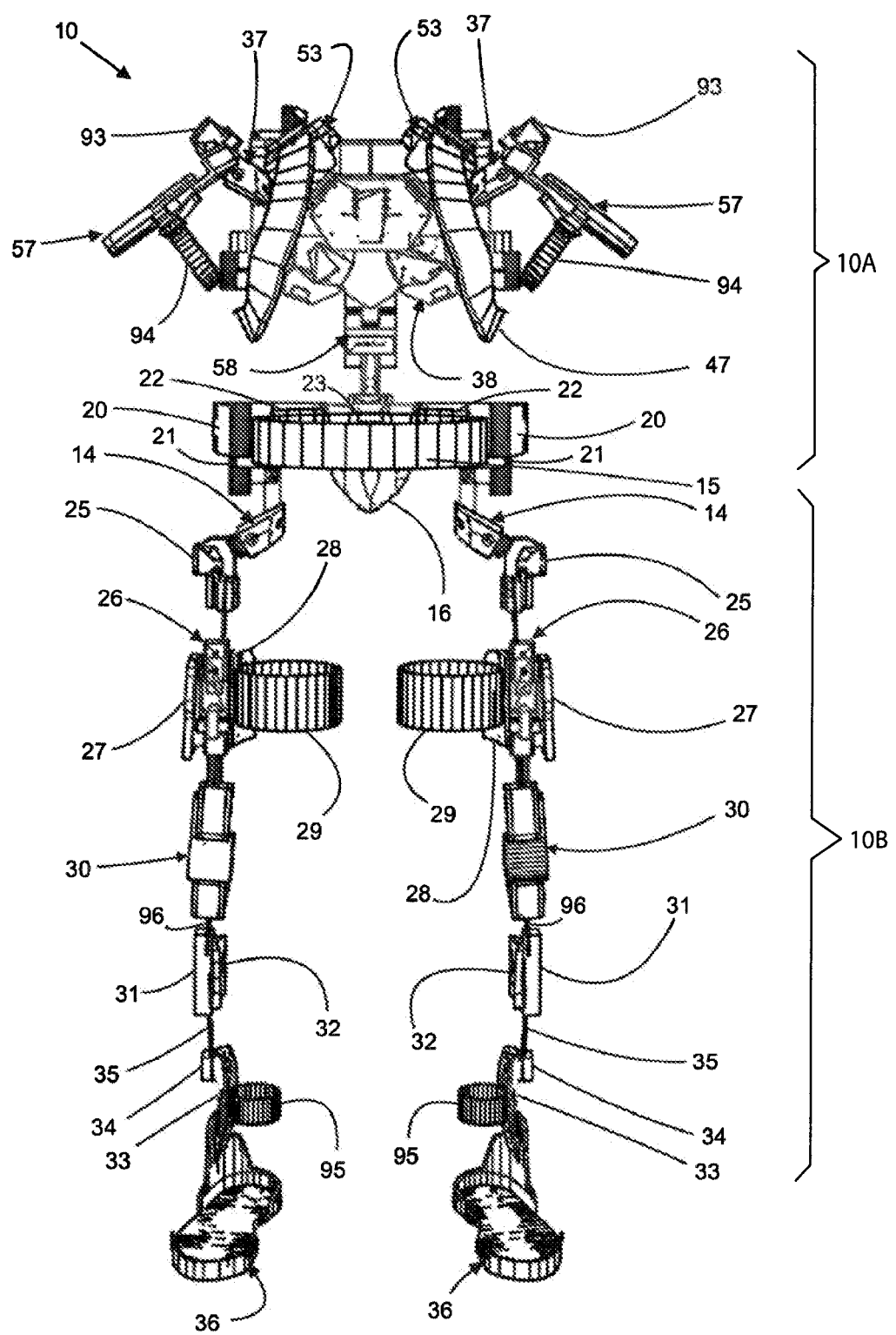
FIG. 1 is a front, perspective-view illustration of a representative full-body modular exoskeleton system in accord with aspects of this disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as exemplifications of the disclosed principles, not limitations of the broad aspects of the disclosure. To that extent, elements and limitations that are described, for example, in the Abstract, Technical Field, Background, Summary, and Detailed Description sections, but not explicitly set forth in the claims, should not be incorporated into the claims, singly or collectively, by implication, inference, or otherwise. Moreover, recitation of "first", "second", "third", etc., in the specification or claims is not used to establish a serial or numerical limitation; rather, these designations may be used for ease of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Referring now to the drawings, wherein like reference numbers refer to the same or similar features throughout the several views, there is shown in FIG. 1 a representative exoskeleton system, which is designated generally at 10 and portrayed herein for purposes of discussion as a modular, hybrid-type full-body exoskeleton structure for an "average" adult human. The illustrated full-body exoskeleton system 10—also referred to herein as "exoskeleton structure" or "exoskeleton" for short—is merely an exemplary application with which aspects of this disclosure may be practiced. In the same vein, utilization of the present concepts for professional athletes (FIG. 7), basketball players (FIG. 8), or combat sports (FIG. 8) should also be appreciated as representative implementations of the inventive concepts disclosed herein. As such, it will be understood that aspects and features of this disclosure may be incorporated into any desired exoskeleton application (e.g., industrial, medicinal, combat, etc.), may be scaled and adapted for users of different sizes, needs, and species, and may be implemented for any logically relevant end user (e.g., professional athletes, amateur athletes, pedestrians, patients, etc.). Moreover, only select components of the exoskeleton systems and wearable sensor devices are shown and described in additional detail below. Nevertheless, the systems and devices discussed herein may include numerous additional and alternative features, and other available peripheral components, for carrying out the various methods and functions of this disclosure.

Figure 2:
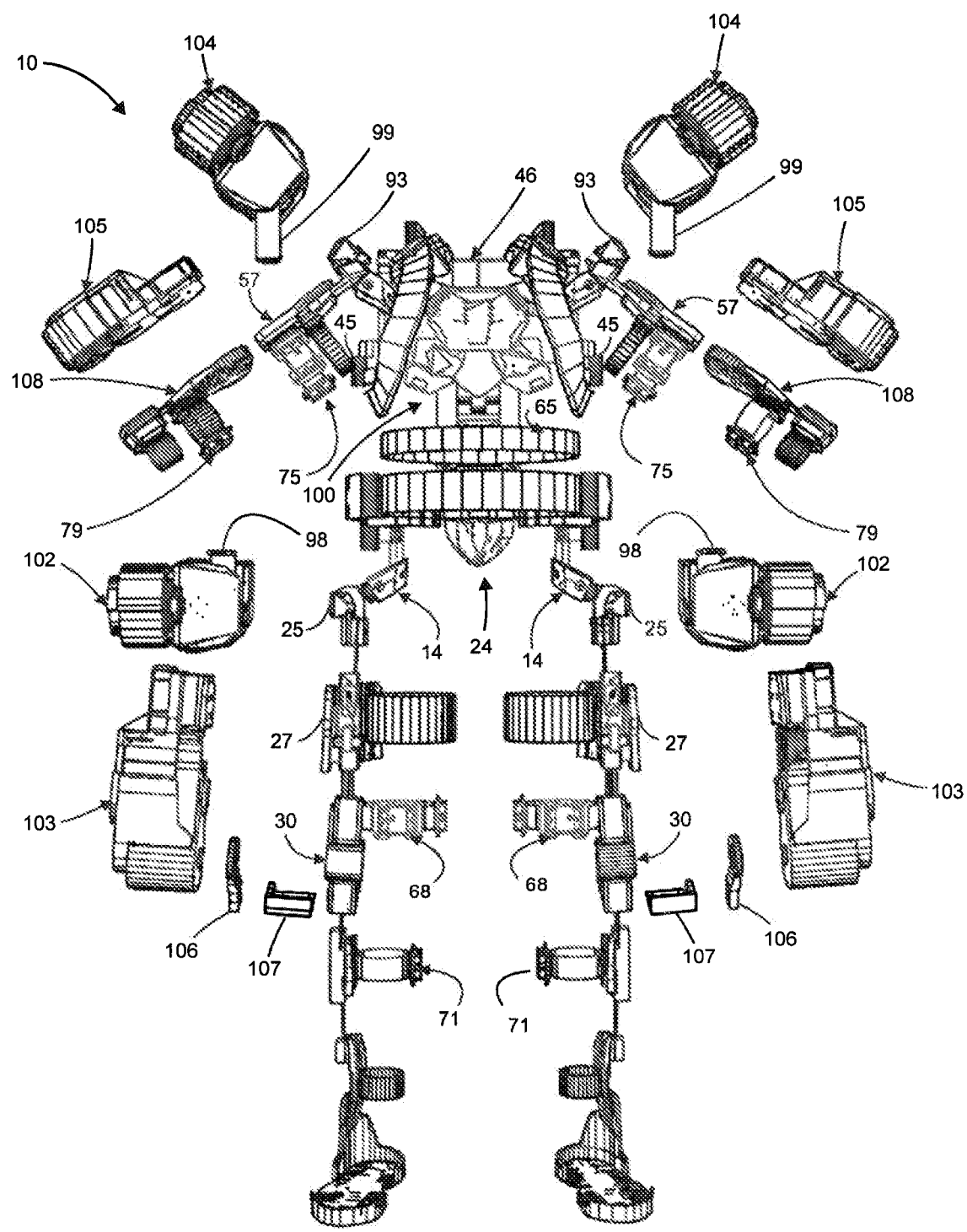
FIG. 2 is a partially exploded, front perspective-view illustration of the representative full-body modular exoskeleton system of FIG. 1 with wireless-enabled wearable sensor devices in accord with aspects of this disclosure.

The exoskeleton system 10 of FIGS. 1 and 2 may be generally delineated into two interconnectable segments: (1) an upper extremity (first) frame section 10A, which generally extends from a waist-hip midpoint to a neck base and physically mounts to the user's trunk region; and (2) a lower extremity (second) frame section 10B, which generally extends from the waist-hip midpoint to an ankle or foot region and physically mounts to the legs of a biped. The upper extremity frame section 10A of the exoskeleton system 10 is releasably joined via a hip assembly 14 to the lower extremity frame section 10B. With his arrangement, the exoskeleton system 10 may be readily modified (e.g., without specialized tools or permanently damaging the skeletal structure) for use of just the upper section 10A, just the lower section 10B, or both sections 10A, 10B. The hip assembly 14, in turn, is connected to an outer waist-hip beltloop shell 21, which includes a waist belt 15 that is looped through a central waist belt loop (not visible in the view provided) to secure the upper section 10A to the user's waist. A waist belt loop cover 22 is placed on top of the beltloop shell 21 to secure the waist belt 15; the beltloop shell 21 is then connected via a waist bracket 20 to the hip assembly 14 and a spine unit assembly 58. A waist central unit and a waist bracket unit (not visible in this view) cooperate with waist bracket units 20 to create an adjustable waist support for the exoskeleton system 10.

A lower outer side region of the hip assembly 14 of FIGS. 1 and 2 connects to a pair of (left and right) exoskeleton hip motor adaptors 25, whereas a bottom region of each hip motor adaptor 25 connects to a respective (left or right) exoskeleton thigh assembly 26. An outer side region of each thigh assembly 26 is connected to a respective exoskeleton knee motor adaptor 27, whereas an inner side region of each thigh assembly 26 is connected to a respective femur outer shell 28. The left (first) and right (second) thigh assemblies 26 each employs a respective thigh strap 29 to releasably attach the thigh assemblies 26 and, thus, the lower extremity section 10B to a user's thighs/upper legs. Each thigh assembly 26 is connected to a respective tibial bracket connector 31 via a respective knee assembly 30 and a respective lower leg upper bracket 96. As will be described in further detail below, the two (left and right) knee assemblies 30 detachably mount thereto knee motor units for mechanization of the user's knee joints. An inner side region of each tibial bracket connector 31 is connected to a respective tibial outer shell 32 that may abut one of the user's tibial regions (e.g., press against the soleus). An optional gas spring (not visible in the views provided) may connect the thigh assembly 26 to the knee assembly 30.

Continuing with the discussion of the exoskeleton's lower extremity section 10B, the two (left and right) tibial bracket connectors 31 are each connected to a respective ankle outer shell 33 via a respective lower leg bracket 35. The two (left and right) lower leg brackets 35 are attached to the (left and right) ankle outer shells 33 via respective shin size adjusters 34. Inner side regions of the ankle outer shells 33 are each provided with an ankle strap 95 that wraps around and releasably attaches the ankle outer shells 33 and, thus, the lower extremity section 10B to the user's ankles/lower legs. A bottom outer side region of each ankle outer shell 33 may optionally attach to a respective exoskeleton foot outer shell 36, which seats thereon and operatively attaches to a user's foot/shoe/boot. The two (left and right) ankle outer shells 33 may articulate with respect to the tibial bracket connectors 31, the connectors 31 may articulate with respect to the thigh assemblies 26, and the thigh assemblies 26 may articulate with respect to the hip assembles 14.

To securely attach and selectively detach the lower extremity section 10B to the upper extremity section 10A, e.g., for a "full body" exoskeleton architecture, the hip assembly 14 releasably attaches to a bottom end of the spine unit assembly 58 via a socket assembly 23 and a tailbone outer shell 16. This spine unit assembly 58 connects at an upper end thereof to a flexible back plate assembly 38, which may abut a wearer's thoracic spinal region. Left and right flanks of the back plate assembly 38 of FIGS. 1 and 2 are provided with respective shoulder outer shell assemblies 53 that contact the user's shoulders. A respective shoulder harness 47 releasably attaches each shoulder assembly 53 and, thus, the back plate assembly 38 and upper extremity section 10A to the user's left and right shoulders/upper body. In this vein, the two (left and right) shoulder harnesses 47 and the two (left and right) shoulder outer shell assemblies 53 aid in keeping the back plate 38 attached to the user's back. An outer side region of each exoskeleton shoulder assembly 37 attaches to an exoskeleton shoulder motor adaptor 93 for attaching thereto a respective shoulder motor unit. Outer ends of the shoulder assemblies 37 also couple to respective upper arm bracket assemblies 57. Each bracket assembly 57 includes an upper arm strap 94 that wraps around and releasably attaches the shoulder assemblies 37 and, thus, the upper extremity section 10A to the user's humerus/upper arm regions.

To transform the unassisted, passive-type exoskeleton architecture of FIG. 1 to a motor-assisted, active-type exoskeleton architecture, FIG. 2 presents a perspective-view illustration of the modular exoskeleton system 10 of FIG. 1 with a distributed array of motor unit modules that are detachably connected via complementary motor unit connectors to the various motor adaptor sections of the exoskeleton 10. In accord with the illustrated example, a pair of (right and left) hip motor unit modules 102 mount on and drivingly connect to the hip motor adaptors 25 on the lower extremity section 10B of the exoskeleton 10 frame structure. Each modular hip motor unit 102 is equipped with a respective hip rotational bracket 98 that connects the motor unit 102 to the hip assembly 14. In so doing, the motor unit modules 102 are selectively actuable to boost and/or automate movement of the hip assemblies 14 and, thus, the hip joints and legs of the user. Additional information on representative modular motor units, as well as attendant transmission, clutch and control hardware, that may be integrated into the exoskeleton 10 of FIGS. 1 and 2 may be found, for example, in commonly owned U.S. patent application Ser. No. 18/160,356, filed Jan. 27, 2023, and U.S. patent application Ser. No. 18/181,637, filed Mar. 10, 2023, both of which are incorporated herein by reference in their respective entireties and for all purposes.

A pair of (right and left) knee motor unit modules 103 mount on and drivingly connect to the knee motor adaptors 27 via knee motor unit brackets 106. Each mated modular knee motor unit 103 and corresponding bracket 106 securely attach to their respective knee assembly 30 via a knee bracket alignment adaptor 107. In so doing, the motor unit modules 103 are selectively actuable to boost and/or automate movement of the knee assemblies 30 and, thus, the user's knee joints and lower legs. When operated in unison, the motor unit modules 102, 103 may assist with gaited locomotion of a user as well as jumping, squatting, climbing, lifting, etc. It should be appreciated that the exoskeleton 10 of FIG. 2 may employ only one or a select subset of or all four motor units 102, 103 depending, for example, on the intended application of the system.

With continuing reference to FIG. 2, a pair of (left and right) shoulder motor unit modules 104 mount on and drivingly connect to the shoulder motor adaptors 93 on the upper extremity section 10A of the exoskeleton 10. Each modular shoulder motor unit 104 is equipped with a respective shoulder rotational bracket 99 that securely connects the motor unit 104 to a back shoulder unit adaptor 45 on the back plate assembly 38. In so doing, the motor unit modules 104 are selectively actuable to boost and/or automate movement of the exoskeleton shoulder assemblies 37 and, thus, the shoulder joints and arms of the user.

A pair of (left and right) elbow motor unit modules 105 mount on and drivingly connect to complementary forearm attachment assemblies 108. Each forearm attachment assembly 108 removably attaches to a user's forearms via straps (as shown). In this regard, each of the herein-described joint and appendage assemblies may employ straps, cables, harnesses, cuffs, or any other suitable means of attachment to operatively mount onto a user. Each of the modular elbow motor units 105 operatively attaches to a respective upper arm bracket assembly 57 on one of the exoskeleton shoulder assemblies 37. In so doing, the motor unit modules 105 are selectively actuable to boost and/or automate movement of the exoskeleton elbow assemblies and, thus, the user's elbow joints and forearms. When operated in unison, the motor unit modules 104, 105 may assist with movement of the upper appendages, e.g., to facilitate lifting, throwing, carrying, gait-related arm swing, etc. It should be appreciated that the exoskeleton 10 of FIG. 2 may employ only one or a select subset of or all four motor units 104, 105 depending, for example, on the intended application of the system.

To govern individual and synchronized operation of the motor unit modules 102, 103, 104, 105, the exoskeleton system 10 may employ a distributed array of sensing devices for actively monitoring real-time or near real-time user variables and system characteristics. The sensing devices may include: (1) a waist biometric sensor assembly 65; (2) a pair of thigh biometric sensor assemblies 68; (3) a pair of lower leg biometric sensor assemblies 71; (4) a pair of upper arm biometric sensor assemblies 75; and (5) a pair of forearm biometric sensor assemblies 79. A rechargeable battery pack 100 may be attached to the back of the back plate assembly 38 and operable to power the exoskeleton's various electronic components. A lower body subsystem CPU 24 provisions input/output (I/O) logic-controlled operation of the sensors, motors, etc., of the lower extremity section 10B, whereas an upper body subsystem CPU 46 provisions I/O logic-controlled operation of the sensors, motors, etc., of the upper extremity section 10A. With this architecture, detachment of the upper extremity exo section 10A from the lower extremity exo section 10A, 10B creates a stand-alone lower body active/passive exoskeleton unit and a stand-alone upper body active/passive exoskeleton unit that may be operated independently from each other. This allows the user to further customize use of the exoskeleton 10 to a myriad of distinct upper and lower body applications. Additional information about the contents, arrangement, and functionality of the exoskeleton system 10 may be found in U.S. Provisional Patent App. Nos. 63/403, 425 (hereinafter "'425 Application") and 63/418,135 (hereinafter "'135 Application"), both of which are incorporated herein by reference in their respective entireties and for all purposes.

Figure 3:
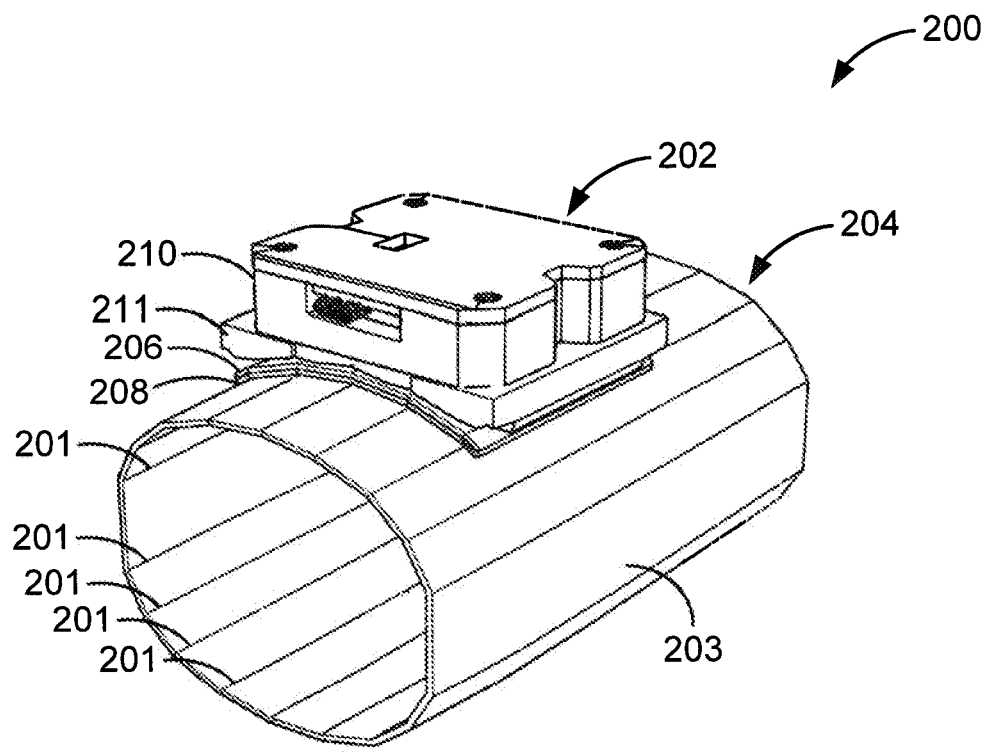
FIG. 3 is a front, perspective-view illustration of a representative wireless-enabled, wearable force sensor device for a wearable sensor system in accord with aspects of this disclosure.

Turning next to FIG. 3, there is shown an example of a wireless-enabled, wearable sensor device, which is designated generally at 200 and portrayed herein for purposes of discussion as a short-range-communication (SRC) capable sensor-integrated force gauntlet. Although differing in appearance, if is envisioned that any of the features and options described above with respect to the wearable sensor devices of FIG. 2, namely biometric sensor assemblies 61, 75, 71 and 79, may be incorporated—singly or in any combination—into the wearable sensor device 200 of FIG. 3, and vice versa. For instance, the biometric sensor assemblies 61, 75, 71, 79 of FIG. 2 may be modified to employ the biometric sensor core (BSC) unit 202 and/or gauntlet cuff 204 of FIG. 3, whereas one or more of the wearable sensor devices 200 of FIG. 3 may be adapted for use with the exoskeleton system 10. On the other hand, the wearable sensor device 200 may be adapted for use as a self-powered, standalone device that monitors and measures dynamic movements of a user's appendage and wirelessly transmits the measured data to a remote computing node (e.g., sensor system 310 of FIG. 8) for aggregation, storage, pre-processing, analysis, fusion, etc.

Wearable sensor device 200 may be a bipartite unit that is generally composed of a hollow and elongated gauntlet cuff 204, which securely and comfortably fits onto a user's wrist or other appendage, and a detachable BSC unit 202, which releasably mounts onto the gauntlet cuff 204 and is operable, for example, to measure real-time forces exerted by a user during a dynamic movement. The gauntlet cuff 204 may be in the nature of a form-fitting compression sleeve that is fabricated, in whole or in part, from a synthetic fiber with high-elastic properties, such as neoprene or elastane or hybrids of such materials with polyester or polyurethane. In the illustrated example, the cuff 204 has a truncated cylindrical geometry with a tapering width and hollow center. To improve cuff resiliency and flexibility, the cuff 204 may be fabricated with one or more longitudinally elongated, mutually parallel ribs 201 that extend the fore-aft length of the cuff body 203. To reduce weight, cost, and complexity, the gauntlet cuff 204 of FIGS. 3 and 4 may be characterized by a lack of one or more or all of the following: a strap, a zipper, a cable, a buckle, a button, a latch, a threaded fastener, and/or a lace. It may be desirable, for at least some applications, that the wearable sensor device 200 consist essentially of the gauntlet cuff 204 and the BSC unit 202, e.g., for simplicity of design and ease of use.

Figure 4:
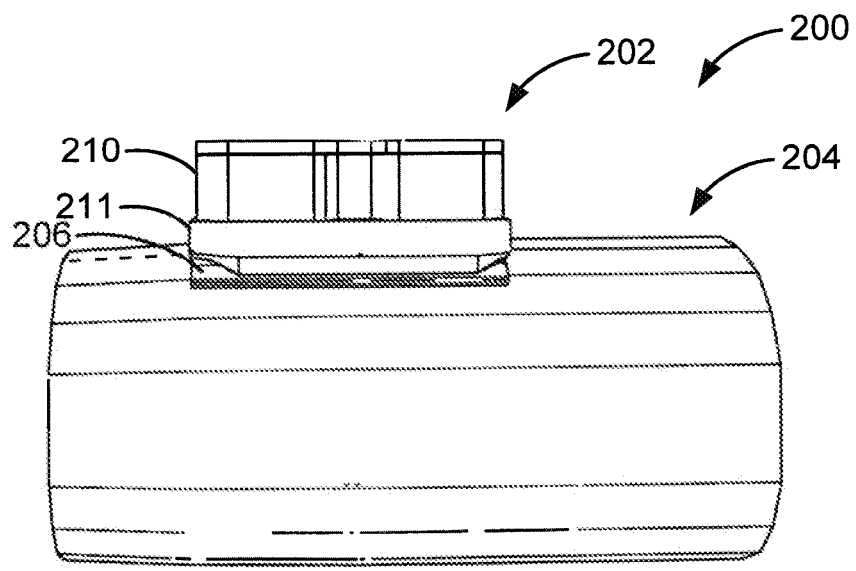
FIG. 4 is a side-view illustration of the representative wearable force sensor device of FIG. 3.
Figure 5:
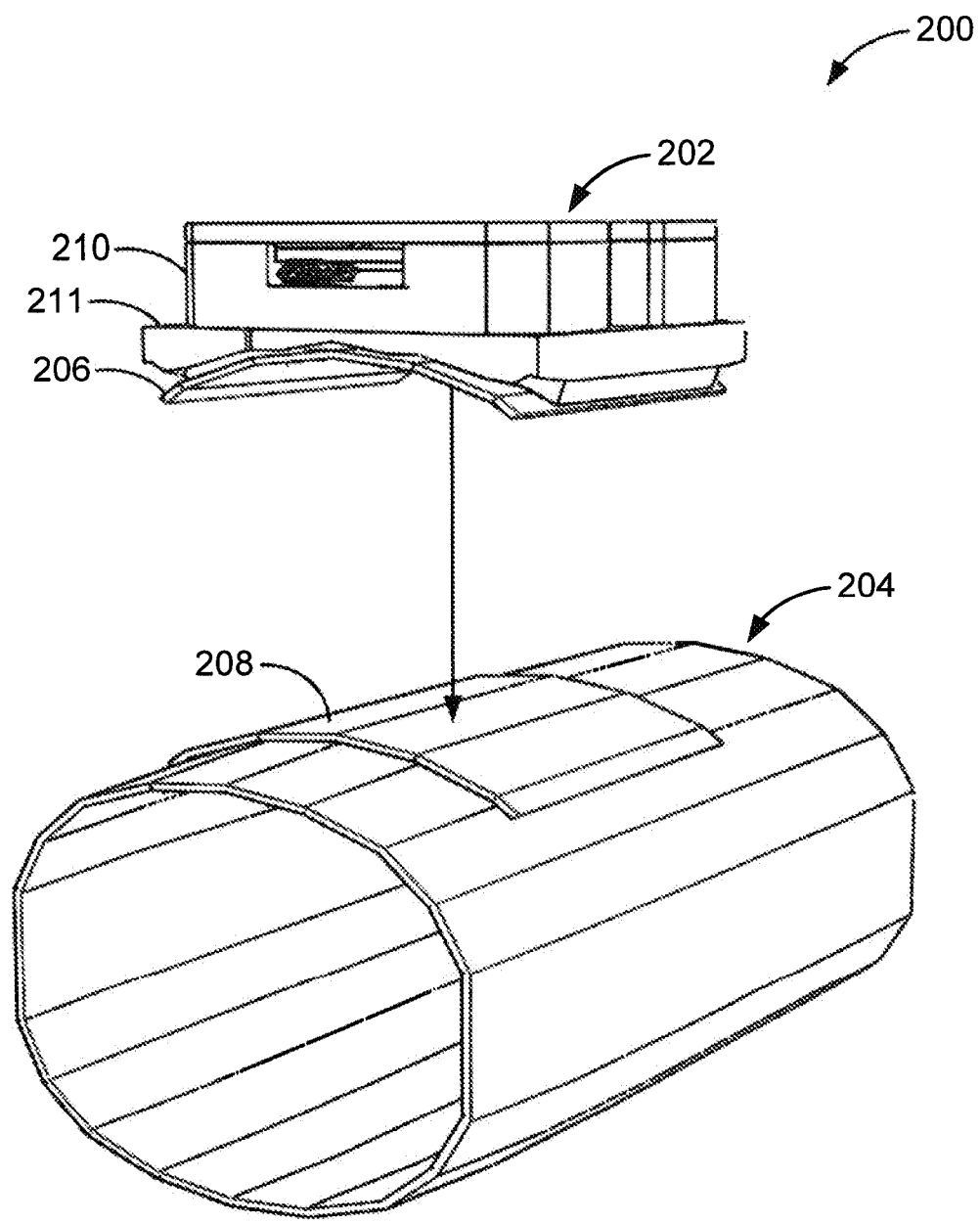
FIG. 5 is a partially exploded, perspective-view illustration of the representative wearable force sensor device of FIG. 3 showing removal of a representative detachable biometric sensor core (BSC) unit from a representative wrist gauntlet.

Also shown in FIGS. 3 and 4 is a biometric senor core unit 202 that may be readily mounted onto and detached from the gauntlet cuff 204. In this example, a top (first) hook-and-loop fastener pad 206 (e.g., with VELCRO® hooks) is attached, e.g., via industrial adhesive (e.g., high-tack, fast-drying epoxy adhesive), stitching, and/or fasteners, to an underside surface of a protective and insulated outer housing 210 of the BSC unit 202. A mating bottom (second) hook-and-lop fastener pad 208 (e.g., with VELCRO® loops) is attached, e.g., via stitching and/or fabric adhesive (e.g., high-strength, waterproof urethane or acrylic adhesive), to a topside exterior surface of the cuff body 203, as best seen in FIG. 5. The mating faces of the top and bottom fastener pads 206, 208 may share a common total surface area which may be approximately equal to a total surface area of the underside surface of the housing 210. Mating of the two hook-and-loop fastener pads 206, 208 facilitates the simplified attachment and detachment of the BSC unit 202 to and from the gauntlet cuff 204, e.g., eliminating the need for threaded fasteners, brackets, latches, etc., for detachably connecting the cuff 202 and BSC unit 204. While portrayed and described as being worn on the wrist or calf, disclosed wearable sensor devices may be adapted to be worn on any portion of a user's body, human or otherwise, including the feet, ankles, thighs, torso, forearms, upper arms, neck, head, etc. To that end, the gauntlet cuff 204 may be replaced by other suitable attachment devices, such as a harness, strap, or pack, or may be eliminated altogether such that the BSC unit 202 is integrated into the user's footwear/apparel or packaged into the exo frame.

Figure 6:
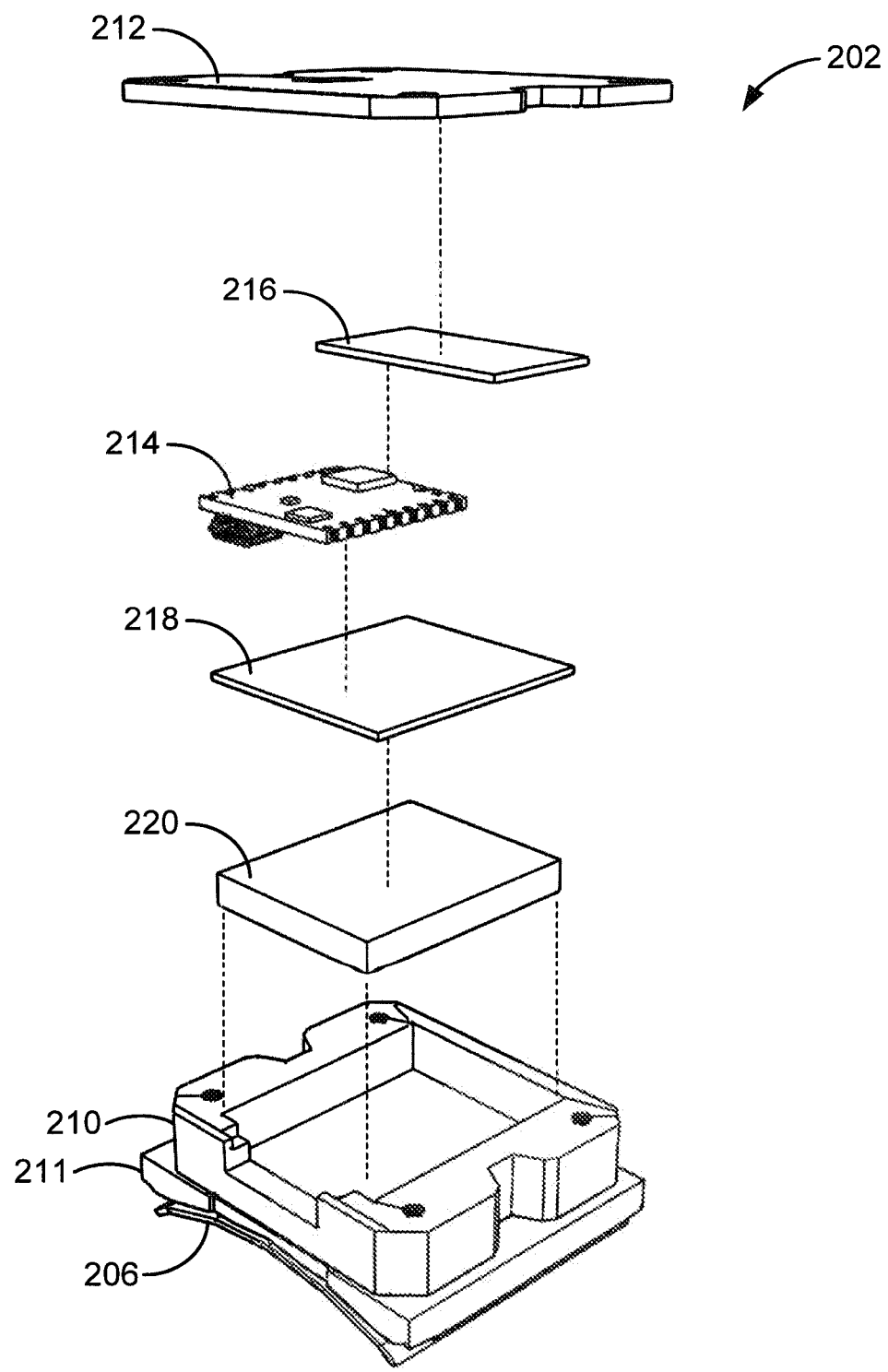
FIG. 6 is an exploded, perspective-view illustration of the representative detachable BSC unit of FIG. 5.

FIG. 6 is a partially exploded illustration showing the constituent parts and internal construction of the biometric sensor core unit 202. In this example, a rigid and substantially flat BSC housing lid 212 mounts onto a top face of the BSC housing 210, e.g., via threaded fasteners, to provide a protective enclosure for the BSC unit's internal electronics. The BSC housing 210 may be integrally formed, e.g., via injection molding or precision machining, as a one-piece construction from a light-weight yet rigid material, such as aluminum, polyvinyl chloride (PVC), or a fiber-reinforced polymer (FRP). While not visible in the views provided, a surface-mounted seal strip, O-ring, or gasket may be interposed between the housing 210 and lid 212 to create a fluid seal for the BSC unit 202. An integral base portion 211 of the BSC housing 210 has a recessed and arcuate bottom surface onto which is rigidly mounted the top fastener pad 206.

An industrial-grade sensor package and microcontroller assembly 214 (collectively referred to herein as "microcontroller assembly" for brevity) is packaged inside the BSC housing 210 and sealed therein by the housing lid 212. As shown, the microcontroller assembly 214 may be in the nature of a system-on-chip integrated circuit with a microcontroller device (e.g., 64 MHz ARM® Cortex-M4F microcontroller), a memory device (e.g., 64 KB SRAM and 512 KB Flash Memory), a multipin header (e.g., SPI full-duplex and I2C half-duplex synchronous master comms), an analog-to-digital converter device (e.g., 12-bit/200 ksps ADC), and an internal antenna. Acting as a standalone wireless sensor system, the microcontroller assembly 214 may also be equipped with a built-in nine degrees of freedom (DoF) motion sensor array: a 3-axis accelerometer, a 3-axis gyroscope, and a 3-axis magnetic sensor (e.g., BOSCH® BHI260AP 6-axis IMU and BOSCH® BMM150 3-axis Magnetometer). This motion sensor array enables real-time monitoring and measurement of multi-axis acceleration (e.g., x-y-z acceleration vectors) and absolute angles (e.g., yaw, pitch, roll), which may be calculated using a combination of accelerometer, gyroscope, and magnetometer readings with corresponding gravity vectors. An integrated wireless communication device (e.g., 4.2 GHz ArduinoBLE® module) may also be incorporated into the microcontroller assembly 214 to provision SRC capabilities. The microcontroller assembly 214 may be securely held in place by a pair of compressible foam pads: a first (top) foam pad 216 sandwiched between and seated against a top face of the microcontroller 214 and a bottom face of the lid 212; and a second (bottom) foam pad 218 sandwiched between and seated against a bottom face of the microcontroller 214 and a top face of a battery module.

Also packaged inside the BSC housing 210 of FIG. 6 is a rechargeable battery module 220, such as a secondary Lithium-ion (Li-Ion) or Lithium Polymer (Li-Po) prismatic cell module, that is electrically connected to the microcontroller 214 for powering the various electronics of the wearable sensor device 200. Integrally formed with or mounted to a bottom surface of the BSC housing 210 is a BSC base portion 211; the base portion 211, in turn, is rigidly attached to the fastener pad 206, as described above. The BSC unit 202, once assembled, may have a shorter longitudinal length and lateral width than that of the gauntlet cuff 204, e.g., to maintain a small form factor and, thus, render the wearable sensor device 200 relatively imperceptible by the athlete when in use. It may be desirable, for at least some applications, that the BSC unit 202 consist essentially of those components shown in FIG. 6, e.g., to provide a self-contained and low-power sensor package with a small footprint and minimal gross unit weight.

Figure 7:
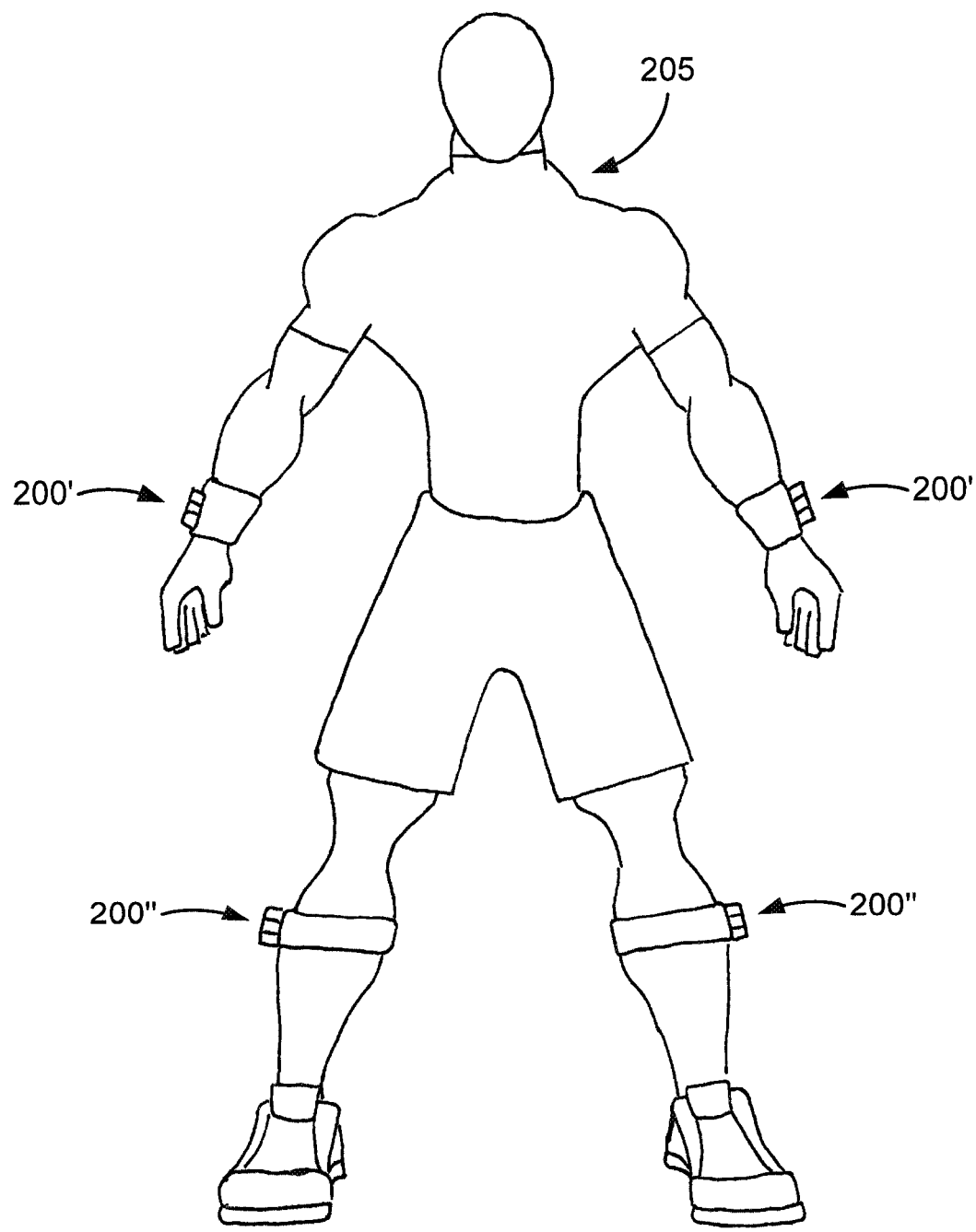
FIG. 7 is an illustration of a representative athlete wearing wrist-worn and leg-worn wireless-enabled force sensor devices of a wearable sensor system in accord with aspects of this disclosure.

Turning next to FIG. 7, there is presented a representative athlete or "user" 205 wearing four of the wearable sensor devices 200 of FIGS. 3-6: two wrist-worn force gauntlets 200' and two calf-worn force gauntlets 200". FIG. 7 portrays the user 205 in a non-limiting example as a male professional athlete, and depicts how the wearable sensor devices 200 described above may be adorned on the body. It may be desirable, for at least some applications, that the wireless-enabled, wearable sensor device 200 be used in complementary pairs for the wrists and lower legs and, where applicable, the use of both pairs together.

Figure 8:
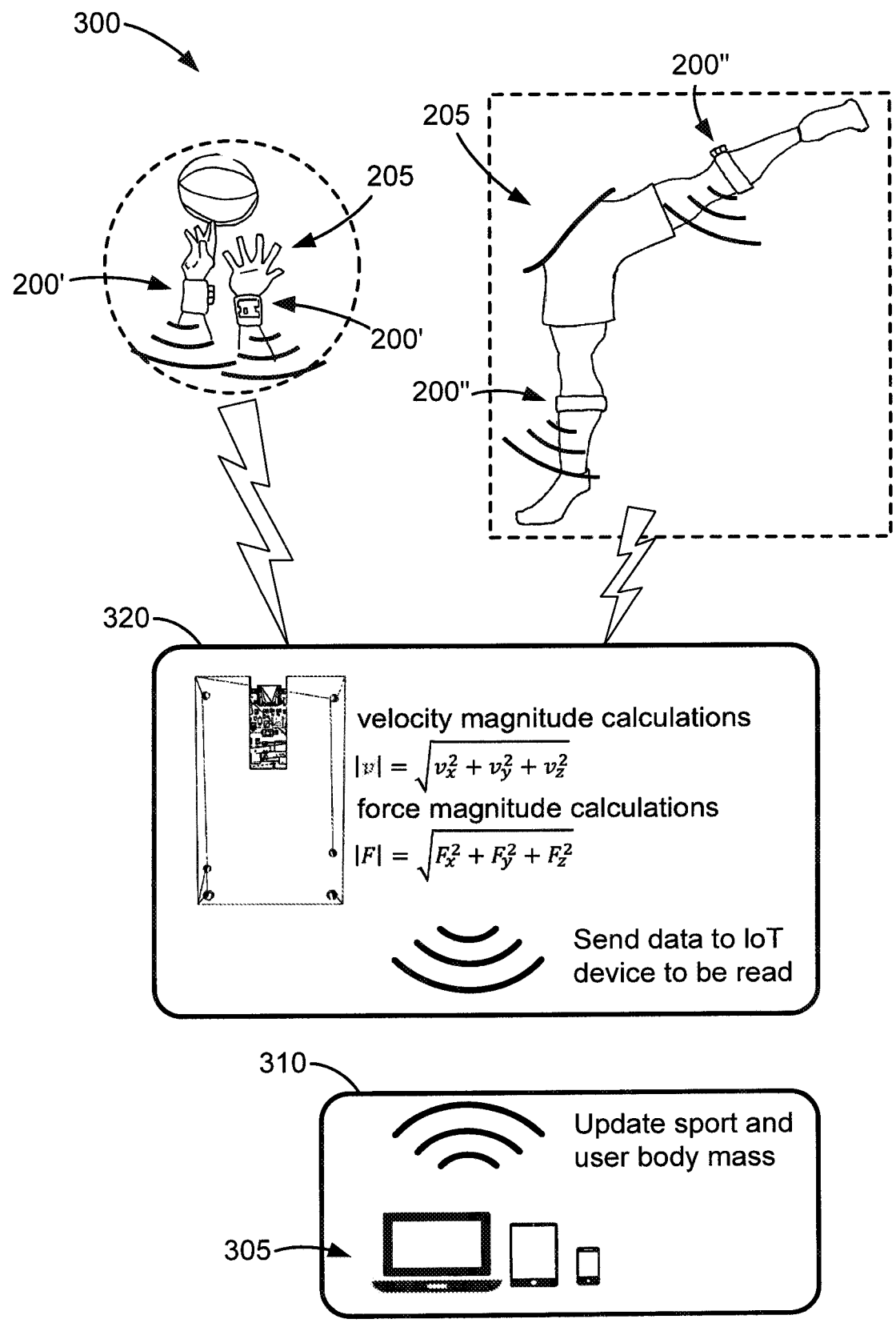
FIG. 8 is a schematic system diagram displaying representative wireless-enabled wearable force sensor device transmitting data to a processing connection system and method in accord with aspects of this disclosure.

FIG. 8 provides a diagrammatic illustration of a representative wireless biometric sensor system and control method, collectively designated as 300, for monitoring dynamic movements and measuring associated forces experienced by different users 205 bearing wrist-worn and ankle-worn wireless sensor devices 200', 200". In this example, one or more alpha biometric sensor devices 200' and/or one or more beta biometric sensor devices 200" collect biometric measurements from users 205 during an athletic activity, such as basketball or kickboxing, or while using an exo device, such as exoskeleton system 10 of FIGS. 1 and 2. The sensors 200', 200" wirelessly transmit data via short-range communication (SRC) (as shown) or long-range communication (LRC) to a resident or remote biometric sensor control system 310 (FIG. 8) and/or one or more motor unit CPUs 24, 46 (FIG. 2), e.g., via a wireless sensor linking node 320. Both the wrist and leg-worn gauntlets are portrayed as using hook-and-lop fasteners for mounting the BSC unit onto the cuff/strap body; however, it is envisioned that other functionally appropriate means may be employed for detachably mounting the BSC unit onto the cuff/strap body, such as snap fasteners, interference-fit connectors, twist-lock connectors, etc.

Using a smartphone, tablet computer, or other wireless-enabled personal computing device, app, or interface (collectively designated 305 in FIG. 8), a user may input a desired operating mode or a set of desired operating parameters during use of the wireless sensor devices 200', 200". By way of example, and not limitation, users 205 of the exoskeleton system 10 may select a passive operating mode; in response, the CPUs 24, 46 and/or sensor control system 310 may power off the motors 102-104 and sensor devices 200', 200". This passive operating mode may allow the user to freely move around with limited or no assistance from the modular exo motor units. If an active operating mode is selected, the motors 102-104 and sensor devices 200', 200" may be powered on with the sensor data used as an input for automated alignment and control of the exo system 10. Additional examples of wireless biometric sensor array and control systems may be found in the '425 and 135 Applications, both of which were incorporated herein by reference above.

Gauntlet sensors, namely the sensor array borne by microcontroller assembly 214 of FIG. 6, may be employed to measure limb acceleration in the x-y-z directions via a 3-axis accelerometer. FIG. 8 provides a diagrammatic illustration of the wireless transfer of sensor data using, for example, BLE to connect to one or more Internet of Things (IoT) devices. As explained earlier, when an athlete performs a dynamic movement with their arms/hands or legs/feet, acceleration data in the x, y and z directions and absolute angle data in the pitch-roll-heading axis will be wirelessly transmitted to a gauntlet sensor linking node 320. This gauntlet sensor linking node 320 may be programmed to process the received sensor data and thereafter send the processed data to any one or more of the illustrated IoT devices (e.g., smartphone, tablet computer, laptop computer, etc.). The gauntlet sensor linking node 320 may contain a wireless communications module and a resident memory device storing therein a library of lookup tables with both male and female body limb mass percentages. These body limb mass percentages may be used as a mass modifier, $\gamma$, with a respective user mass, $m_{user}$, to calculate a relative limb mass m':

$$m' = m_{user}\gamma$$

From the calculation of relative limb mass, individual forces in the x, y, and z directions may be calculated as:

$$Force_x = m'\alpha_x$$

$$Force_y = m'\alpha_y$$

$$Force_z = m'\alpha_z$$

where $\alpha_x$, $\alpha_y$, and $\alpha_z$ are gravitational force vectors in the x, y, and z planes. Using these component forces, a magnitude of the force, |Force|, may be calculated as a final force value that will be observed by the user:

$$|Force| = \sqrt{F_x^2 + F_y^2 + F_z^2}$$

Velocities in the x, y, and z directions may then be calculated via multiplying x, y, and z acceleration values, respectively, by a time interval difference, $\Delta t$, set in the algorithm based on a preset loop time of the program:

$$velocity_x = \alpha_x \Delta t$$

$$velocity_y = \alpha_y \Delta t$$

$$velocity_z = \alpha_z \Delta t$$

Using the foregoing component velocities, a magnitude of velocity, |velocity|, may be calculated as the final velocity value the user will observe:

$$|velocity| = \sqrt{v_x^2 + v_y^2 + v_z^2}$$

Hand (left and right) and/or foot (left and right) force and velocity values, once calculated, may then be sent from the gauntlet sensor linking node 320 to the biometric sensor control system 310 to be stored, evaluated, further processed, displayed and/or read by a user.

Gauntlet sensors, namely the sensor array borne by microcontroller assembly 214 of FIG. 6, may also be employed to measure limb acceleration in the x-y-z directions via a 3-axis accelerometer and limb absolute angles via sensor fusion of the 3-axis accelerometer, 3-axis gyroscope, and 3-axis magnetometer. Absolute angles are calibrated via an orientation fixing using the absolute gravity-vector. When the absolute specified gravity-vector position for the pitch axis of rotation parameter is reached the code creates a vector map angle function for the pitch rotation angles using all 3-axis gravitys-vectors governed via the following parameter modifying equation:

$$\theta_{axis} = \left| \phi \pm \frac{\text{gravity vector}_{axis}}{N} \right|$$

Where $\theta_{axis}$ is the rotation axis calculated via the absolute value of the addition or subtraction of $\phi$, equal to 90° or 270° depending on gravity-vector location and axis, by the rotation axis gravity-vector divided by N which is a variable that converts the gravity vector to 90° increments. The value of N changes based upon the location and axis of the gravity-vector. Also after the absolute specified gravity-position is for the pitch axis of rotation parameter is reached the code stores the initial pitch rotation angle $rot_{pitchi}$. The initial pitch rotation angle is phase shifted via the following:

$$rot_{pitchi} = (360 - rot_{pitchi}) + 90$$

Following the phase shifting of the initial pitch angle offset calculation is created using the vector map angle function observed via the following equation:

$$\text{pitch offset} = |rot_{pitchi} - \text{vector map pitch}|$$

Following the calibration of the pitch rotational angle, the calibration of the roll and heading rotational angles are performed respectively using the same steps previously described. After the calibration of the 3-axis rotational angles, the code goes into an infinite loop where all angles accessed can now become absolute via the following phase shift and rotational axis offset equations:

$$angle_{pitch} = (359 - angle_{pitch}) + 90$$

$$rot_{pitch} = angle_{pitch} \pm pitch_{offset}$$

$$angle_{roll} = (359 - angle_{roll}) + 90$$

$$rot_{roll} = angle_{roll} \pm \text{roll offset}$$

$$angle_{heading} = (359 - angle_{heading}) + 90$$

$$rot_{heading} = angle_{heading} \pm \text{heading offset}$$

Addition or subtraction the above rotational axis offset equations occur based upon whether the pitch offset, roll offset, and heading offset values calculated during calibration are greater than or less than the initial rotation angles $rot_{pitchi}$, $rot_{rolli}$, and $rot_{heading}$. If the offset value is less than the initial rotation angles the offset is subtracted. Also, if the offset value is greater than the initial rotation angles the offset is added. If microcontroller is powered off all calibration steps must be repeated via very slight tilting about all rotational axis starting with pitch, roll, then heading. Athletic performance gestures may be predicted using the absolute angles combination via a machine-leaning (ML) library based upon the sport that is being performed.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the disclosure expressly includes any and all combinations and subcombinations of the preceding elements and features.

What is claimed:

1. A sensor system for monitoring movement of a user, the sensor system comprising:
   a wearable sensor device including:
      an expandable device body consisting essentially of a compression sleeve, configured to be worn on and friction fit with an appendage of the user, and a mounting interface attached to the compression sleeve; and
      a biometric sensor core (BSC) unit removably mounted to the mounting interface and containing a microcontroller assembly integral with a microcontroller device, a biometric sensor array, and a wireless communication device; and
   a sensor linking node communicatively connectable to the wireless communication device to wirelessly receive sensor data from the BSC unit and configured to wirelessly communicate the received sensor data with a remote computing node.

2. The sensor system of claim 1, wherein the mounting interface includes an attachment pad removably mounting thereon the BSC unit without any one of a threaded fastener, a bracket, a latch, an adhesive, and a snap fastener.

3. The sensor system of claim 1, wherein the mounting interface includes a first fastener pad with one of multiple hooks or multiple loops, and the BSC unit includes a second fastener pad with the other of the multiple hooks or the multiple loops, the multiple hooks mating with the multiple loops to releasably attach the first fastener pad to the second fastener pad.

4. The sensor system of claim 1, wherein the microcontroller assembly includes a single integrated circuit (IC) chip with the microcontroller device, the biometric sensor array, and the wireless communication device all mounted onto the single IC chip.

5. The sensor system of claim 4, wherein the biometric sensor array includes a multi-axis motion sensor connected to the wireless communication device and operable to measure motion of the appendage of the user.

6. The sensor system of claim 5, wherein the multi-axis motion sensor is an embedded nine degrees-of-freedom (DoF) motion sensor array with a 6-axis inertial measurement unit (IMU) and a 3-axis magnetometer.

7. The sensor system of claim 4, wherein the wireless communication device includes an embedded Bluetooth Low Energy (BLE) module.

8. The sensor system of claim 1, wherein the BSC unit further includes:
   a BSC unit housing defining therein a housing compartment with an opening, the microcontroller assembly disposed inside the housing compartment; and
   a BSC unit lid detachably mounted onto the BSC unit housing to thereby cover the opening and secure the microcontroller assembly inside the housing compartment.

9. The sensor system of claim 8, wherein the BSC unit further includes a rechargeable battery module disposed inside the housing compartment and operable to power the microcontroller assembly.

10. The sensor system of claim 9, wherein the BSC unit further includes a pair of foam pads disposed inside the housing compartment on opposing sides of the microcontroller assembly.

11. The sensor system of claim 10, wherein the BSC unit consists essentially of the BSC unit housing, the BSC unit lid, the microcontroller assembly, the rechargeable battery module, and the foam pads.

12. A wearable sensing device for a sensor system, the wearable sensing device comprising:
- an expandable device body consisting essentially of a compression sleeve, structurally configured to friction fit onto an appendage of a user, and a mounting interface rigidly mounted onto the compression sleeve; and
- a biometric sensor core (BSC) unit removably mounted onto the mounting interface of the expandable device body, the BSC unit including:
  - a BSC unit housing defining therein a housing compartment with an opening;
  - a BSC unit lid detachably mounted onto the BSC unit housing and covering the opening;
  - a microcontroller assembly disposed inside the housing compartment and integral with a microcontroller device, a biometric sensor array, and a wireless communication device; and
  - a rechargeable battery module disposed inside the housing compartment and operable to power the microcontroller assembly.

13. A method of assembling a wearable sensing device for a sensor system with a wireless-enabled linking node, the method comprising:
- receiving an expandable device body consisting essentially of a compression sleeve, configured to be worn on and friction fit with an appendage of the user, and a mounting interface attached to the compression sleeve; and
- removably attaching a biometric sensor core (BSC) unit to the mounting interface, the BSC unit containing a microcontroller assembly integral with a microcontroller device, a biometric sensor array, and a wireless communication device communicatively connectable to the wireless-enabled linking node.

14. The method of claim 13, wherein the mounting interface includes an attachment pad removably mounting thereon the BSC unit without any one of a threaded fastener, a bracket, a latch, an adhesive, and a snap fastener.

15. The method of claim 13, wherein the mounting interface includes a first fastener pad with one of multiple hooks or multiple loops, and the BSC unit includes a second fastener pad with the other of the multiple hooks or the multiple loops, the multiple hooks mating with the multiple loops to releasably attach the first fastener pad to the second fastener pad.

16. The method of claim 13, wherein the microcontroller assembly includes a single integrated circuit (IC) chip with the microcontroller device, the biometric sensor array, and the wireless communication device all mounted onto the single IC chip.

17. The method of claim 13, wherein the BSC unit further includes:
- a BSC unit housing defining therein a housing compartment with an opening, the microcontroller assembly disposed inside the housing compartment; and
- a BSC unit lid detachably mounted onto the BSC unit housing to thereby cover the opening and secure the microcontroller assembly inside the housing compartment.

18. The method of claim 17, wherein the BSC unit further includes a rechargeable battery module disposed inside the housing compartment and operable to power the microcontroller assembly.

19. The method of claim 18, wherein the BSC unit further includes a pair of foam pads disposed inside the housing compartment on opposing sides of the microcontroller assembly.

20. The method of claim 19, wherein the BSC unit consists essentially of the BSC unit housing, the BSC unit lid, the microcontroller assembly, the rechargeable battery module, and the foam pads.

\* \* \* \* \*